United States Patent
Chen

(10) Patent No.: US 10,077,905 B2
(45) Date of Patent: Sep. 18, 2018

(54) METHOD FOR CONTROLLING GAS LEAK

(71) Applicant: Chiun Nien Chen, Taichung (TW)

(72) Inventor: Chiun Nien Chen, Taichung (TW)

(*) Notice: Subject to any disclaimer, the term of this patent is extended or adjusted under 35 U.S.C. 154(b) by 238 days.

(21) Appl. No.: 15/222,904

(22) Filed: Jul. 28, 2016

(65) Prior Publication Data
US 2018/0031248 A1    Feb. 1, 2018

(51) Int. Cl.
*F24C 3/12* (2006.01)
*G01M 3/04* (2006.01)

(52) U.S. Cl.
CPC .............. *F24C 3/122* (2013.01); *G01M 3/04* (2013.01)

(58) Field of Classification Search
CPC ........... F24C 3/122; G01M 3/04; G01M 3/26; G01M 3/2876
See application file for complete search history.

(56) References Cited

U.S. PATENT DOCUMENTS 4,168,719 A * 9/1979 Renshaw ................ F23N 1/005
                                                         137/312
8,844,561 B2 * 9/2014 Keller ................ F02M 25/0836
                                                         137/487.5

* cited by examiner

*Primary Examiner* — Eric Keasel
(74) *Attorney, Agent, or Firm* — Alan D. Kamrath; Kamrath IP Lawfirm, P.A.

(57) ABSTRACT

A method for controlling gas leak includes a step of providing gas for a pre-set period of time automatically; a step of cutting off gas supply automatically by cutting off electric power for the electro-magnetic valve so that the piston of the electro-magnetic valve seals an opening of an inlet path; a step of checking gas leak by using a pressure detection device in the safety valve to check gas pressure after the gas is filled in the safety valve and the pipe for a period of time, the pressure detection device transferring detected signals to a circuit board, and the detected signals being used as a basis of judgement of gas leak, and a step of supplying gas again and checking the pressure by the pressure detection device.

3 Claims, 2 Drawing Sheets

METHOD FOR CONTROLLING GAS LEAK

BACKGROUND OF THE INVENTION

1. Fields of the Invention

The present invention relates to a method for controlling gas leak, and more particularly, to a method for checking gas leak before igniting the gas stoves.

2. Descriptions of Related Art

The conventional gas leak detection device known to applicant generally comprises a body which has a magnetic device and a magnetic-spring switch in one end thereof, and a sensing device and a pressure detection device are located in the other end of the body. The magnetic device and the pressure detection device are electrically connected to a circuit board which is able to feed back or transmits signals. The body has an entrance which communicates with a valve room which is in communication with a path which communicates with an outlet and a detection room. Each of the valve room and the detection room has a cover connected thereto. The magnetic device is located in the valve room and controlled to generate magnetic force. The magnetic-spring switch is located above the magnetic device and the path. The magnetic-spring switch is normally closed and can be opened by the magnetic device. The pressure detection device is deformed up and down by the gas entering the path. The pressure detection device has a control point at the underside thereof, and the control point moves up and down along with the deformation of the pressure detection device. The pressure detection device is able to detect the position of the control point and electrically connected with the circuit board. The magnetic-spring switch normally closes the path and the outlet. The gas enters into the valve room from the entrance, and flows to the outlet and the detection room via the path. The magnetic device is externally controlled to generate magnetic force to attract the magnetic-spring switch so as to open the path. When the gas enters into the detection room, the pressure detection device detects the position of the control point. When the control point is located close to the pressure detection device, this means that the gas pressure is sufficient. On the contrary, when the control point moves away from the pressure detection device, this means that the gas pressure is lost due to gas leak. When the pressure detection device detects the gas leak, the magnetic device controls the magnetic-spring switch to close the path.

However, when the magnetic device is controlled from outside and generates magnetic force, the gas continuously supplied to the regulator and the path. Specifically, when the regulator or the path has a minor leakage, the volume of the gas that flows from the valve room to the path is larger than that of the leakage, the control point of the pressure detection device does not move, so that the gas leak cannot be detected. The users use the gas stoves while the gas is filled in the kitchen, and this may lead to a dangerous result.

The present invention intends to provide a method for checking gas leak before igniting the gas stoves, so as to eliminate the shortcomings mentioned above.

SUMMARY OF THE INVENTION

The present invention relates to a method for controlling gas leak, and comprising the following steps:
a step (A): providing gas for a pre-set period of time automatically:

an electro-magnetic valve is activated externally for a pre-set period of time by a control member to allow gas to fill a safety valve and an inside of a pipe via an entrance path;

a step (B): cutting off gas supply automatically:

cutting off electric power for the electro-magnetic valve, a piston of the electro-magnetic valve sealing an opening of an inlet path;

a step (C): checking gas leak:

using a pressure detection device in the safety valve to check gas pressure after the gas is filled in the safety valve and the pipe for a period of time, the pressure detection device transferring detected signals to a circuit board, the detected signals being used as a basis of judgement of gas leak; and a step (D): supplying gas again:

the electro-magnetic valve being kept as de-activated if a detected value of the pressure detection device in the safety valve is smaller than a pre-set value, or if a detected value of the pressure detection device in the safety valve is gradually reduced, so that no gas is sent to the safety valve and the pipe; the electro-magnetic valve being activated again if a detected value of the pressure detection device in the safety valve reaches a pre-set value and is maintained unchanged, so that gas is supplied into the safety valve and the pipe.

Therefore, before the gas stoves are ignited, any gas leak happened to the safety valve or the pipe can be detected, and no gas is supplied so as to avoid from gas explosion and/or being poisoned by carbon monoxide.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
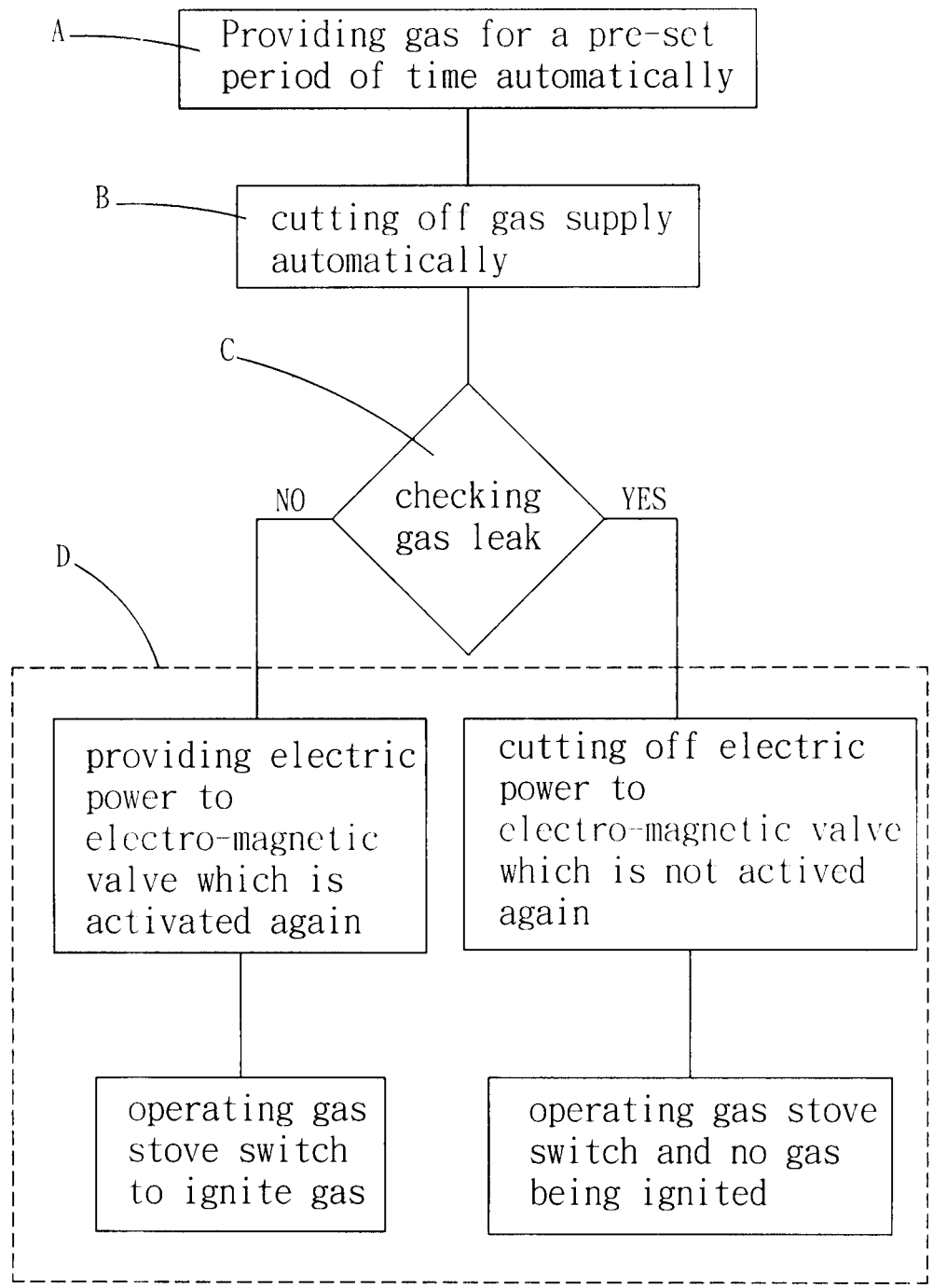
FIG. 1 shows the steps of the method of the of the present invention.
Figure 2:
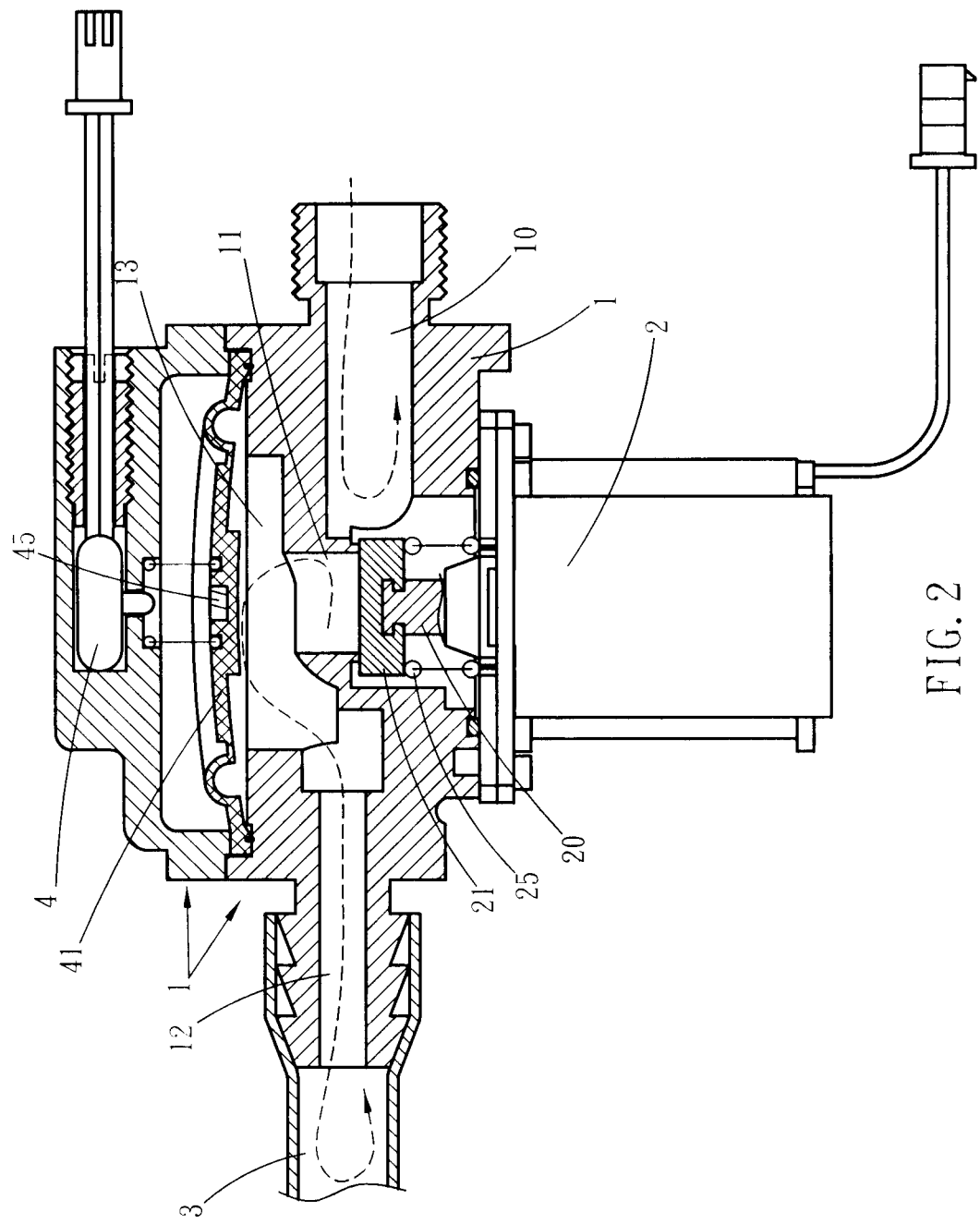
FIG. 2 is a cross sectional view to show the safety valve with which the method of the present invention is proceeded.

Referring to FIGS. 1 and 2, the method for controlling gas leak of the present invention comprises the following steps:

A step (A): providing gas for a pre-set period of time automatically.

The electro-magnetic valve 2 is activated externally for a pre-set period of time by a control member (not shown) to move the piston 21 on the shaft 20 of the electro-magnetic valve 2 to move away from the entrance path 10 of the safety valve 1, so that gas is allowed to fill the inlet path 11, the room 13, the outlet path 12 and the inside of the pipe 3 via the entrance path 10 of the safety valve 1. The gas in the room 13 pushes the membrane 41 upward (outward) so that the magnetic member 45 on the membrane 41 moves toward the pressure detection device 4 which then detects the pressure value. The communication between the opening of the inlet path 11 of the safety valve 1 and the piston 21 of the electro-magnetic valve 2 is normally closed.

A step (B): cutting off gas supply automatically.

After the electro-magnetic valve 2 is activated for the pre-set period of time, the electric power (micro current or micro voltage) for the electro-magnetic valve 2 is automatically cut off. The piston 21 of the electro-magnetic valve 2 is pushed to seal the opening of the inlet path 11 by the spring 25, so that the gas cannot flow to the inlet path 11, the room 13 and the outlet path 12 from the entrance path 10 of the safety valve 1.

A step (C): checking gas leak.

After the gas is filled in the inlet path 11, the room 13, the outlet path 12 and the pipe 3 for a period of time, the pressure detection device 4 in the safety valve 1 is used to check gas pressure, and the pressure detection device 4 transferring the detected signals to a control portion of a circuit board (not shown). The detected signals are used as a basis of judgement of gas leak. If the detected amount of gas leak is below the value of the national standard, then the judgement is made to be no gas leak.

A step (D): supplying gas again.

If the pressure detection device 4 in the safety valve 1 detects that the detected value of the gas pressure in the inlet path 11, the room 13, the outlet path 12 and the pipe 3 for a period of time is smaller than a pre-set value, or if the detected value of the pressure detection device 4 in the safety valve 1 is gradually reduced, this means there is a gas leak. The circuit board (not shown) cuts off the electric power to the electro-magnetic valve 2. Therefore, the opening of the inlet path 11 of the safety valve 1 is sealed by the piston 21 of the electro-magnetic valve 2. In other words, no gas is sent to the inlet path 11, the room 13, the outlet path 12 and the pipe 3 via the entrance path 10. Even if the switch of the gas stove is operated, no gas is ignited.

If the pressure detection device 4 in the safety valve 1 detects that the detected value of the gas pressure in the inlet path 11, the room 13, the outlet path 12 and the pipe 3 for a period of time reaches a pre-set value and is maintained unchanged, this means there is no gas leak. The circuit board (not shown) provides the electric power to the electro-magnetic valve 2. Therefore, the opening of the inlet path 11 of the safety valve 1 is opened because the piston 21 of the electro-magnetic valve 2 is moved away from the opening of the inlet path 11 of the safety valve 1. Gas is ensured to be supplied to the inlet path 11, the room 13, the outlet path 12 and the pipe 3. Therefore, when the user operates the switch to ignite the gas.

The method of the present invention uses the control member (not shown) to activate the electro-magnetic valve 2 to provide gas to fill the inlet path 11, the room 13, the outlet path 12 and the inside of the pipe 3 via the entrance path 10 of the safety valve 1. And the power for the electro-magnetic valve 2 is automatically cut off, and the gas pressure in the inlet path 11, the room 13, the outlet path 12 and the inside of the pipe 3 is detected to make sure that the gas pressure is maintained the same. When the gas pressure is maintained the same, the electro-magnetic valve 2 can be activated to ignite the gas. On the contrary, when the gas pressure in the inlet path 11, the room 13, the outlet path 12 and the inside of the pipe 3 is detected to be abnormal, the supply of the gas is cut off to ensure that no gas will be ignited.

Therefore, before the gas stoves are ignited, any gas leak happened to the safety valve 1 or the pipe 3 can be detected, and no gas is supplied so as to avoid from gas explosion and/or being poisoned by carbon monoxide.

While we have shown and described the embodiment in accordance with the present invention, it should be clear to those skilled in the art that further embodiments may be made without departing from the scope of the present invention.

What is claimed is:

1. A method for controlling gas leak, comprising:
a step (A): providing gas for a pre-set period of time automatically: an electro-magnetic valve being activated externally for a pre-set period of time by a control member to allow gas to fill a safety valve and an inside of a pipe via an entrance path;
a step (B): cutting off gas supply automatically: cutting off electric power for the electro-magnetic valve, a piston of the electro-magnetic valve sealing an opening of an inlet path;
a step (C): checking gas leak: using a pressure detection device in the safety valve to check gas pressure after the gas is filled in the safety valve and the pipe for a period of time, the pressure detection device transferring detected signals to a circuit board, the detected signals being used as a basis of judgement of gas leak; and
a step (D): supplying gas again: the electro-magnetic valve being kept as de-activated if a detected value of the pressure detection device in the safety valve is smaller than a pre-set value, or if a detected value of the pressure detection device in the safety valve is gradually reduced, so that no gas is sent to the safety valve and the pipe; the electro-magnetic valve being activated again if a detected value of the pressure detection device in the safety valve reaches a pre-set value and is maintained unchanged, so that gas is supplied into the safety valve and the pipe.

2. The method as claimed in claim 1, wherein the piston of the electro-magnetic valve is magnetically attracted and moved away from the opening of the inlet path of the safety valve when the electro-magnetic valve is activated.

3. The method as claimed in claim 1, wherein a communication between the opening of the inlet path of the safety valve and the piston of the electro-magnetic valve is normally closed.

* * * * *